US009430711B2

(12) United States Patent
Akiyama

(10) Patent No.: US 9,430,711 B2
(45) Date of Patent: Aug. 30, 2016

(54) FEATURE POINT MATCHING DEVICE, FEATURE POINT MATCHING METHOD, AND NON-TRANSITORY COMPUTER READABLE MEDIUM STORING FEATURE MATCHING PROGRAM

(75) Inventor: Tatsuo Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 13/984,004

(22) PCT Filed: Nov. 1, 2011

(86) PCT No.: PCT/JP2011/006108
§ 371 (c)(1),
(2), (4) Date: Aug. 6, 2013

(87) PCT Pub. No.: WO2012/114401
PCT Pub. Date: Aug. 30, 2012

(65) Prior Publication Data
US 2013/0315490 A1    Nov. 28, 2013

(30) Foreign Application Priority Data
Feb. 23, 2011    (JP) ................... 2011-037069

(51) Int. Cl.
*G06K 9/46* (2006.01)
*G06K 9/62* (2006.01)
*G06T 7/00* (2006.01)

(52) U.S. Cl.
CPC .............. *G06K 9/46* (2013.01); *G06K 9/6211* (2013.01); *G06T 7/0044* (2013.01); *G06K 2209/01* (2013.01)

(58) Field of Classification Search
CPC ...................................................... G06K 9/46

USPC ......................................................... 382/201
See application file for complete search history.

(56) References Cited

FOREIGN PATENT DOCUMENTS

| JP | 61-175509 A |   | 8/1986 |
|----|-------------|---|--------|
| JP | 61175509 A  | * | 8/1986 |
| JP | 3-156349 A  |   | 7/1991 |
| JP | 2001-92963 A |  | 4/2001 |
| JP | 2004-219520 A | | 8/2004 |
| JP | 2004219520 A | * | 8/2004 |
| JP | 2005-228150 A | | 8/2005 |

(Continued)

OTHER PUBLICATIONS

International Search Report (ISR) (PCT Form PCT/ISA/210), in PCT/JP2011/006108, dated Dec. 13, 2011.

*Primary Examiner* — Stephen R Koziol
*Assistant Examiner* — Delomia L Gilliard
(74) *Attorney, Agent, or Firm* — McGinn IP Law Group PLLC

(57) ABSTRACT

A feature point matching device includes a position feature generation unit for generating a position feature quantity for a feature point based on a position of the feature point included in an image, a pixel value feature generation unit for generating a pixel value feature quantity for the feature point based on a pixel value of the feature point included in the image, and a feature matching unit for matching a first feature point and a second feature point based on a degree of matching between a first position feature quantity generated from a first image and a second position feature quantity generated from a second image and a degree of matching between a first pixel value feature quantity generated from the first image and a second pixel value feature quantity generated from the second image.

20 Claims, 13 Drawing Sheets

(56) References Cited

FOREIGN PATENT DOCUMENTS

| JP | 2005228150 A * | 8/2005 | |
| JP | WO 2010053109 A1 * | 5/2010 | ....... G06F 17/30247 |
| WO | WO 2008/066152 A1 | 6/2008 | |
| WO | WO 2010/053109 A1 | 5/2010 | |

* cited by examiner

FEATURE POINT MATCHING DEVICE, FEATURE POINT MATCHING METHOD, AND NON-TRANSITORY COMPUTER READABLE MEDIUM STORING FEATURE MATCHING PROGRAM

TECHNICAL FIELD

The present invention relates to a feature point matching device, a feature point matching method, and a non-transitory computer readable medium storing a feature point matching program, and particularly to a feature point matching device, a feature point matching method, and a non-transitory computer readable medium storing a feature point matching program that are capable of matching feature points with high accuracy from images even when the images are deformed by geometric transformation such as affine transformation and projective transformation.

BACKGROUND ART

A feature point arrangement matching device is, for example, included in an image matching device as a function of the image matching device. Patent literature 1 discloses an image matching device that includes a following feature point arrangement matching function. Note that patent literature 1 calculates a coordinate sequence of ordered feature points as a feature point arrangement.

This function is, in principle, composed of a registration image invariant calculation module, a search image invariant calculation module, and an invariant match evaluation module. The registration image invariant calculation module calculates an invariant from a feature point arrangement calculated from a registration image. The search image invariant calculation module calculates an invariant from a feature point arrangement of a search image. The feature point arrangement matching function with such a configuration is, in principle, realizes matching of the feature point arrangements in the following operation. First, a feature vector is calculated in advance from a position coordinate of the feature point included in the feature point arrangement of the registration image in a registration process. Next, a feature vector is calculated from a position coordinate of the feature point included in the feature point arrangement of the search image in a search process. Subsequently, degree of similarity is calculated between the feature vector obtained in the registration process and the feature vector obtained in the search process. Then, the feature point arrangements are matched by evaluating whether the degree of similarity is within a predetermined range.

An image matching device disclosed in patent literature 1 includes a projective affine parameter estimation module, a partial region projective module, a projective image matching module, and an image matching result calculation module. The projective affine parameter estimation module includes three modules that make up the feature point arrangement matching function. This image matching device calculates a geometric transformation parameter from a pair of feature point arrangements in which a pair of feature vectors that are evaluated as a match is calculated in two images to be matched. The image matching device, using the calculated geometric transformation parameter, projects one of the images on the other for each partial region, matches the image for each partial region, integrates matching results for the partial regions, and obtains a final image matching result.

In regard to a generation method of the feature point arrangement, there are other known methods than the one disclosed in patent literature 1. For example, a document image feature quantity generation device disclosed in patent literature 2 can be used.

Further, an image matching device disclosed in patent literature 3 includes a following feature point group matching function. Note that the present invention distinguishes between a feature point group and a feature point arrangement. The term feature point group simply indicates a set of feature points. When the feature points belonging to the feature point group are ordered, the ordered feature point group shall be referred to as the feature point arrangement.

This function is, in principle, composed of two image feature data group generation units and a matching unit. The two image feature data group generation units calculate, from a basic image and a sample image, a pair of two-dimensional vector (V) and a two-dimensional pixel position (R) for a scan point. The two-dimensional vector (V) is a spatial gradient of the average luminance around the scan point that satisfies a predetermined condition in the image. The matching unit, using a relationship between the two-dimensional vector (V) and the two-dimensional pixel position (R) that are calculated respectively by the two image feature data group generation units, performs a voting process to set a high voting value to a particular pixel value when the feature point groups are correctly associated. This feature point group matching function realizes the process of matching the feature point groups by the two image feature data groups calculating the two-dimensional vector (V) and the two-dimensional pixel position (R), and then the operation by the matching unit.

In the technique disclosed by patent literature 3, voting is performed based on the relationship between the two-dimensional vector and the two-dimensional pixel position. Therefore, it is considered to be the technique effective in the case in which the two images to be voted for move in parallel to each other, rotate, or are in a relationship in combination thereof. However, this technique is not suitable, in principle, to the case in which the two images to be voted for are in a relationship of the two-dimensional affine transformation or projective transformation (any transformation that projects a plane on a plane) to each other.

An image matching method disclosed in patent literature 4 calculates the degree of similarity in image matching. This image matching method estimates a geometric transformation parameter based on a matching result for each local region using information of a pair of corresponding local regions. Next, the image matching method corrects the position based on the estimated geometric transformation parameter, performs a relative position voting process, and calculates the degree of similarity in image matching. In the image matching method, local regions are associated instead of feature points as a result of matching. This image matching method can be applied to images, in principle, even when the image is affine transformed or projective transformed as long as the association between the local regions can be obtained appropriately. However, while the image is affine transformed or the projective transformed, the larger the size of the local region, the more the matching accuracy of the local regions deteriorates. Therefore, accuracy in matching the resultant images is considered to deteriorate as well.

CITATION LIST

Patent Literature

Patent literature 1: International Patent Publication No. WO 2010/053109
Patent literature 2: International Patent Publication No. WO 2008/066152
Patent literature 3: Japanese Unexamined Patent Application Publication No. 2005-228150
Patent literature 4: Japanese Unexamined Patent Application Publication No. 2001-092963

SUMMARY OF INVENTION

Technical Problem

There is a problem in the techniques explained in background that it is difficult to match feature point groups or feature point arrangements with high accuracy when one of two images that are originally the same is deformed by the geometric transformation with greater flexibility such as the affine transformation and projective transformation in a two-dimensional plane.

The reason for this is that the abovementioned matching of the feature point groups or the feature point arrangements adopts the method (method disclosed in patent literature 3) that is susceptible, in terms of accuracy deterioration, to the geometric transformation with greater flexibility such as the two-dimensional affine transformation and the two-dimensional projective transformation or the method (method disclosed in patent literature 1) that uses only positions of the feature points in the feature point arrangements.

The problem in patent literature 1 is explained in more detail using FIGS. 12 and 13. FIG. 12 shows two different kinds of images. FIG. 13 is a conceptual diagram for explaining a state of extracting feature points from each of the two different kinds of images shown in FIG. 12. This example assumes, as the feature point, a centroid point of a connection component that is obtained after binarizing the image. The black dots in FIG. 13 represent the positions of the feature points. Although the two images shown in FIG. 12 originally differ, the feature point groups obtained from the images are the same or similar, as shown in FIG. 13. For this reason, it is extremely difficult to distinguish one image from another by the feature point arrangements obtained from both images.

Such a problem is generated because only the positions of the feature points are used to evaluate whether the feature point groups or the feature point arrangements are the same.

A purpose of the present invention is to provide a feature point matching device, a feature point matching method, and a non-transitory computer readable medium storing a feature matching program that are capable of matching feature points with high accuracy from images even when the images are deformed by geometric transformation such as affine transformation and projective transformation.

Solution To Problem

In a first exemplary aspect of the present invention, a feature point matching device includes position feature generation means for generating a position feature quantity for at least one feature point based on a position of the at least one feature point included in an image, pixel value feature generation means for generating a pixel value feature quantity for the at least one feature point based on a pixel value of the at least one feature point included in the image, and feature matching means for matching at least one first feature point and at least one second feature point based on a degree of matching between a first position feature quantity and a second position feature quantity and a degree of matching between a first pixel value feature quantity and a second pixel value feature quantity, in which the first position feature quantity is generated by the position feature generation means from the at least one first feature point included in a first image, the second position feature quantity is generated by the position feature generation means from the at least one second feature point included in a second image, the first pixel value feature quantity is generated by the pixel value feature generation means from the at least one first feature point, and the second pixel value feature quantity is generated by the pixel value feature generation means from the at least one second feature point.

In a second exemplary aspect of the present invention, a method of matching a feature point including generating a first position feature quantity for at least one first feature point based on a position of the at least one first feature point included in a first image, generating a first pixel value feature quantity for the at least one first feature point based on a pixel value of the at least one first feature point, generating a second position feature quantity for at least one second feature point based on a position of the at least one second feature point included in a second image, and generating a second pixel value feature quantity for the at least one second feature point based on a pixel value of the at least one second feature point; and matching the at least one first feature point and the at least one second feature point based on a degree of matching between the first position feature quantity and the second position feature quantity and a degree of matching between the first pixel value feature quantity and the second pixel value feature quantity.

In a third exemplary aspect of the present invention, a non-transitory computer readable medium storing a feature point matching program for causing computer to execute a process of generating a first position feature quantity for at least one first feature point based on a position of the at least one first feature point included in a first image, generating a first pixel value feature quantity for the at least one first feature point based on a pixel value of the at least one first feature point, generating a second position feature quantity for at least one second feature point based on a position of the at least one second feature point included in a second image, and generating a second pixel value feature quantity for the at least one second feature point based on a pixel value of the at least one second feature point, and a process of matching the at least one first feature point and the at least one second feature point based on a degree of matching between the first position feature quantity and the second position feature quantity and a degree of matching between the first pixel value feature quantity and the second pixel value feature quantity.

Advantageous Effects of Invention

According to the above aspects of the present invention, it is possible to provide a feature point matching device, a feature point matching method, and a non-transitory computer readable medium storing a feature matching program that are capable of matching feature points with high accuracy from images even when the images are deformed by geometric transformation such as affine transformation and projective transformation.

DESCRIPTION OF EMBODIMENTS

First Exemplary Embodiment

Figure 1:
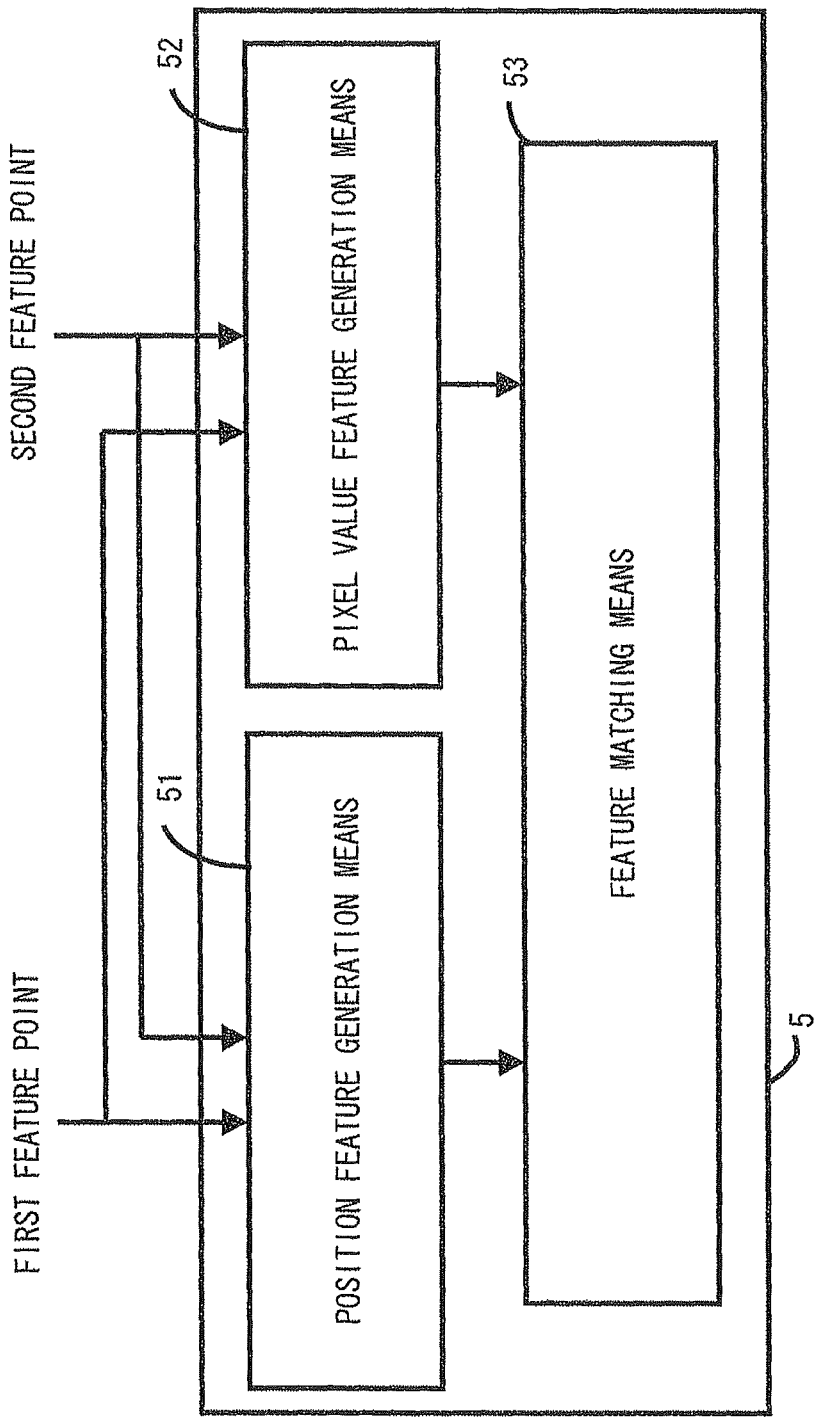
FIG. 1 is a block diagram showing a configuration of a feature point matching device according to a first exemplary embodiment of the present invention.

First, a feature point matching device 5, which is an overview of a feature point arrangement matching device 1, according to a first exemplary embodiment of the present invention is explained with reference to FIG. 1. FIG. 1 is a block diagram showing a configuration of the feature point matching device 5 according to the first exemplary embodiment of the present invention.

The feature point matching device 5 includes position feature generation means 51, pixel value feature generation means 52, and feature matching means 53.

The position feature generation means 51 generates a position feature quantity for at least one feature point based on a position of the at least one feature point included in an image. The pixel value feature generation means 52 generates a pixel value feature quantity for the at least one feature point based on a pixel value of the at least one feature point included in the image. The feature matching means 53 matches at least one first feature point and at least one second feature point based on a degree of matching between a first position feature quantity and a second position feature quantity and a degree of matching between a first pixel value feature quantity and a second pixel value feature quantity, in which the first feature quantity is generated by the position feature generation means 51 from the at least one first feature point included in a first image, the second feature point quantity is generated by the position feature generation means 51 from the at least one second feature point included in a second image, the first pixel value feature quantity is generated by the pixel value feature generation means 52 from the at least one first feature point, and the second pixel value feature quantity is generated by the pixel value feature generation means 52 from the at least one second feature point.

Next, an operation of the feature point matching device 5 according to the first exemplary embodiment of the present invention is explained.

The at least one first feature point included in the first image is externally input to the position feature generation means 51. The position feature generation means 51 generates the first position feature quantity for the at least one first feature point based on the position of the at least one first feature point that has been input. The at least one first feature point included in the first image is externally input to the pixel value feature generation means 52. The pixel value feature generation means 52 generates the first position feature quantity for the at least one first feature point based on the pixel value of the at least one first feature point that has been input.

The at least one second feature point included in the second image is externally input to the position feature generation means 51. The position feature generation means 51 generates the second position feature quantity for the at least one second feature point based on the position of the at least one second feature point that has been input. The at least one second feature point included in the second image is externally input to the pixel value feature generation means 52. The pixel value feature generation means 52 generates the second position feature quantity for the at least one second feature point based on the pixel value of the at least one second feature point that has been input.

The feature matching means 53 matches the at least one first feature point and the at least one second feature point based on the degree of matching between the first position feature quantity and the second position feature quantity and the degree of matching between the first pixel value feature quantity and the second pixel value feature quantity.

Note that the order of generating the first position feature quantity, the second position feature quantity, the first pixel value feature quantity, and the second pixel value feature quantity is not limited to the abovementioned order. Moreover, any two or more feature quantities of those quantities may be generated in parallel.

Figure 2:
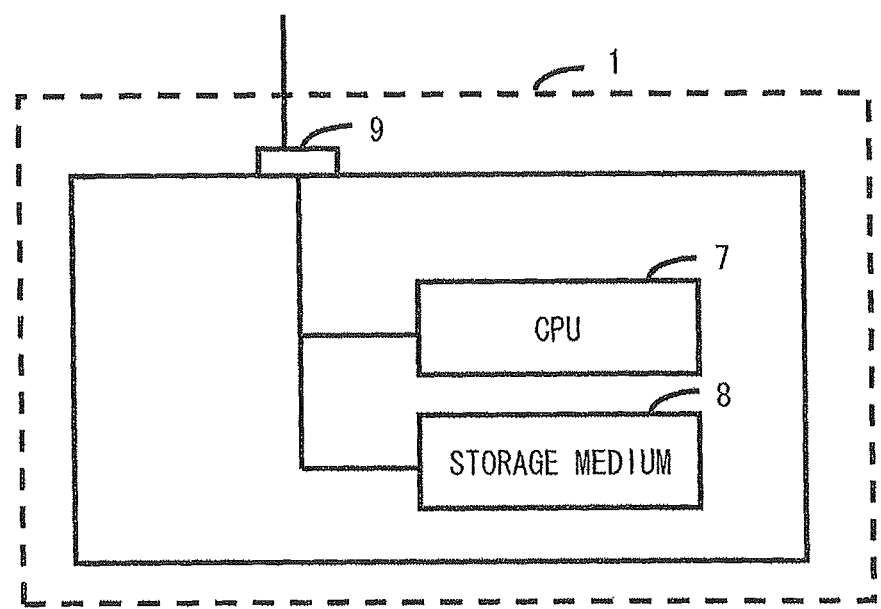
FIG. 2 is a diagram showing an example of a hardware configuration of the feature point matching device according to the first exemplary embodiment of the present invention.

Next, the best mode for carrying out the invention is explained in detail with reference to the drawings. FIG. 2 is a block diagram showing a configuration of the feature point arrangement matching device 1 according to the first best exemplary embodiment of the present invention.

Referring to FIG. 1, the feature point arrangement matching device 1 is composed of an arithmetic unit (hereinafter merely referred to as CPU) 7 represented by CPU (Central Processing Unit), for example, and a storage medium 8. Moreover, an input and output interface 9 may also be included.

The CPU 7 manages the entire operation of the feature point arrangement matching device 1 by executing various software programs (computer programs) incorporating various means described below. The storage medium 8 stores data necessary for the various software programs and their execution. The storage medium is, for example, a memory, a hard disk and the like.

The input and output interface 9 is used for data communication with outside the feature point arrangement matching device 1. As an example of data for communication, there is feature point arrangement data that is input from outside of the feature point arrangement matching device 1, and feature point arrangement matching result data that is output from the feature point arrangement matching device 1, however, it is not limited to this. The input and output interface 9 should at least be capable of communicating with the CPU 7. As the input and output interface 9, a connector for connecting a communication line capable of transferring external signals and a device for receiving wireless signals can be used, for example. Alternatively, a part of a signal communication path inside the feature point arrangement matching device 1 can be used as-is.

Figure 3:
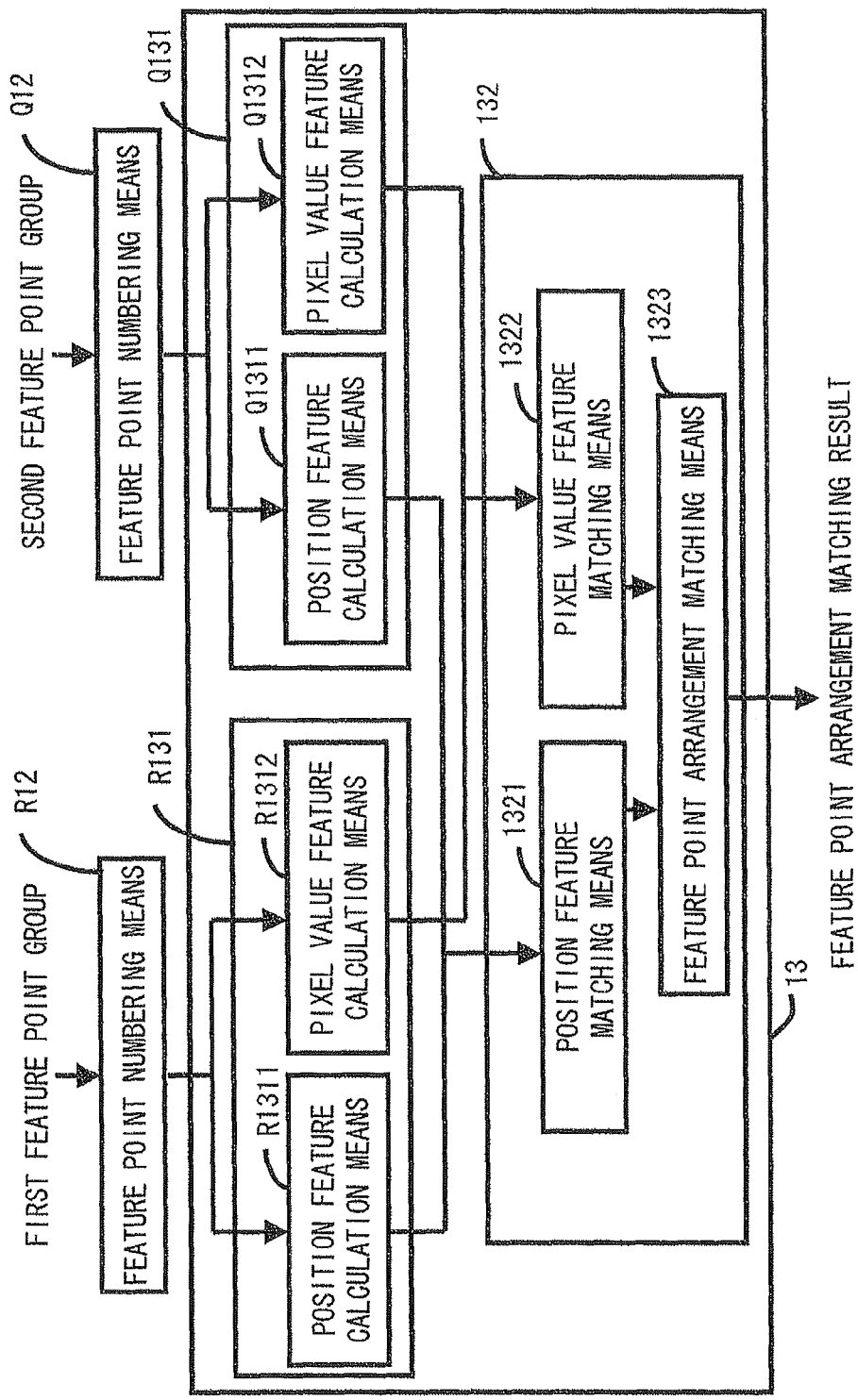
FIG. 3 is a block diagram showing a configuration of the feature point matching device according to the first exemplary embodiment of the present invention.

FIG. 3 is a block diagram showing a software configuration in a feature point arrangement matching device 13 according to the first best exemplary embodiment of the present invention. Referring to FIG. 3, the feature point arrangement matching device 13 is composed of feature point numbering means R12 and Q12, feature calculation means R131 and Q131, and feature matching means 132.

The feature point numbering means R12 orders the feature points, by a method described later, in a first feature point group that is externally input so as to calculate a first feature point arrangement. In the explanation below, a feature point group is information indicating position coordinates and pixel values of the feature points. Moreover, the ordered feature point group shall be referred to as a feature point arrangement. That is, the feature point arrangement is information indicating the position coordinates, the pixel values, and the order of the feature points. The feature point numbering means R12 outputs the first feature point arrangement to the feature calculation means R131. Further, the feature point may be any point as long as it is an point on the image indicating feature of the image. For example, the feature point is a centroid point of a joined region composed of one or more connected regions that are obtained by binarizing an image or a feature point in pixel value distribution.

The feature point numbering means Q12 calculates a second feature point arrangement from a second feature point group that is externally input. The feature point numbering means Q12 outputs the second feature point arrangement to the feature calculation means R131.

Then, the feature calculation means R131 calculates a feature from the first feature point arrangement that has been input. The feature calculation means Q131 calculates a feature from the second feature arrangement that has been input. The feature point numbering means R12 and the feature point numbering means Q12 have the same configuration and execute the same operation. Similarly, the feature calculation means R131 and the feature calculation means Q131 have the same configuration and execute the same operation. However, in the case, for example, when the nature of images from which the feature points have been extracted is different, either the configuration or operation may be changed in at least one of the feature point numbering means R12 and the feature point numbering means Q12 or at least one of the feature calculation means R131 and the feature calculation means Q131.

In the following explanation, unless otherwise noted, the feature point numbering means R12 and the feature point numbering means Q12 have the same configurations, and the feature calculation means R131 and the feature calculation means Q131 have the same configurations. Note that R12 is unnecessary when the feature points in the first feature point group are already numbered, and Q12 is unnecessary when the feature points in the second feature point group are already numbered.

The feature point numbering means R12 calculates the first feature point arrangement from the first feature point group, as described above. For example, the order of the feature point group is obtained by performing processes from (A) to (C) below for a target point in a provided feature point group (the number of feature points is n). In this example, n is any positive integer.

(A) First, select m points near the target point from the feature point group. In this example, m is any positive integer. For example, m is any number less than n. (B) Next, select a point nearest to the target point from the m points and number the selected point to be the first in the order. (C) Search for m−1 feature points clockwise about the target point from the position of the first feature point and select the second to mth feature points in the searched order. The method of ordering is not necessarily limited to this method. In these processes, one point provided in advance from the n feature points may be the target point, or the above processes may be repeated until all the n points are used as the target point. For example, in (C), the feature point arrangement is composed of the neighboring m feature points, but the feature point arrangement may be composed of m+1 feature points including the target point.

The feature point numbering means Q12 calculates the second feature point arrangement from the second feature point group in a similar manner as the feature point numbering means R12. A relationship between n and m is explained with reference to a specific example. As an example, all feature points included in one image shall be a feature point group (the number of feature points is n) where m+1<n, and every m or m+1 feature points of the input feature point group may compose the feature point arrangement. As another example, the feature points for the number corresponding to the feature point arrangement among all feature points included in one image may be the feature point group (the number of feature points is n) where m+1=n, and m or m+1 feature points may compose the feature point arrangement. That is, in the latter case, every feature points corresponding to the feature point arrangement extracted from one image are input sequentially, as the feature point group, to the feature point numbering means R12 and Q12.

The feature calculation means R131 calculates a first feature set necessary for matching the feature point arrangements from the coordinates and pixel values of the feature points in the first feature point arrangement that is input from the feature point numbering means R12. The feature calculation means R131 is composed of position feature calculation means R1311 and pixel value feature calculation means R1312.

The position feature calculation means R1311 calculates the first position feature quantity for the first feature arrangement based on the coordinates of the feature points included in the first feature point arrangement that is input from the feature point numbering means R12. The position feature calculation means R1311 calculates the feature quantity based on the positions of the feature points of the first feature point arrangement. For example, as disclosed in patent literature 2, the position feature calculation means R1311 may calculate, as the position feature quantity, a feature vector with the geometric transformation invariant as an element that is calculated based on the coordinate of the feature point. Specifically, the position feature calculation means R1311 calculates the feature vector by calculating the invariant from the coordinate of the selected feature point for each of a plurality of possible combinations when selecting the predetermined number of feature points from the m feature points in conformity to the abovementioned order. That is, the position feature quantity is information (feature vector) including arranged geometric invariants that are calculated according to the abovementioned order. The position feature quantity here is not limited to such a feature vector. For example, a combination of the position coordinates belonging to the feature point arrangement may be the position feature quantity. That is, the information including the position coordinates of the feature points arranged in the abovementioned order may be the position feature quantity.

The pixel value feature calculation means R1312 calculates the first pixel value feature quantity for the first feature point arrangement based on the pixel values of the feature points included in the first feature point arrangement that has been input from the feature point numbering means R12. The values that can be used as the pixel value quantity are, for example, luminance values of the feature points in the feature point arrangement and coordinate values (corresponding to a value of an R component, a value of a G component, and a value of a B component for points in an RGB space) of points in a color space, for example the RGB color system, the XYZ color system, or the HSV color system. Moreover, a value calculated based on the coordinate values of the points in the color space, for example, values obtained by normalizing the component of the feature quantity by an appropriate width may be used. The pixel value feature quantity is, for example, information including the pixel values of the feature points arranged in the abovementioned order. That is, the pixel value is, for example, the luminance value, the coordinate value in the color space and the like. When the coordinate value of the feature point is not an integer value and the pixel value cannot be obtained directly, it is possible to use the pixel value of the feature point that is estimated, using a known method, from the coordinates and pixel values of the points with defined pixel values around the feature point and a positional relationship between those points and the feature point. For example, as the known method, linear interpolation can be employed, but it is not limited to this. As described above, in this exemplary embodiment, the first feature set is composed of the first position feature quantity and the first pixel value feature quantity. The feature calculation means R131 outputs the calculated first feature set to the feature matching means 132.

Since the feature calculation means Q131 calculates a second feature set from the coordinates and pixel values of the feature points in the second feature point arrangement that is input from the feature point numbering means Q12 in a similar manner as the feature calculation means R131, the explanation is not provided here. Since position feature calculation means Q1311 and pixel value feature calculation means Q1312 composing the feature calculation means Q131 are similar to the position feature calculation means R1311 and the pixel value feature calculation means R1312 respectively, the explanation is not provided here. As a result, the feature calculation means Q131 calculates the second feature set that is composed of the second position feature quantity and the second pixel value feature quantity. The feature calculation means Q131 outputs the calculated second feature set to the feature matching means 132.

The feature matching means 132 matches the first feature set and the second feature set that are calculated by the feature calculation means R131 and Q131 so as to evaluate whether or not the feature point arrangements are the same. As a preferable example, the feature matching means 132 is composed of position feature matching means 1321, pixel value feature matching means 1322, and feature point arrangement matching means 1323.

The position feature matching means 1321 evaluates whether or not the first position feature quantity and the second position feature quantity are the same. A known method may be used for the evaluation. For example, the degree of similarity is calculated by a known method, where the position feature quantity is considered as a vector, using a city block distance and a Euclidean distance between the vectors, an inner product of the vectors, and an angle between the two vectors. Then, a method can be employed in which when the calculated degree of similarity is within a predetermined range (usually a smaller value is used), an evaluation is made that the position feature quantities match. That is, when the position feature quantities substantially match, an evaluation may be made that the position feature quantities match. The substantial match here indicates that the degree of matching between the position feature quantities is within a predetermined range including the case when the position feature quantities completely match. The position feature matching means 1321 outputs an evaluation result indicating whether or not the position feature quantities match to the feature point arrangement matching means 1323. Alternatively, the degree of similarity may be output as-is as the evaluation result.

The pixel value feature matching means 1322 evaluates whether or not the first pixel value feature quantity and the second pixel value feature quantity are the same. A known method may be used for the evaluation. For example, the degree of similarity is calculated by a known method, where the feature quantity is considered as a vector, using a city block distance and a Euclidean distance between the vectors, an inner product of the vectors, and an angle between the two vectors. Then, a method can be employed in which when the calculated degree of similarity is within a predetermined range (usually a smaller value is used), the position feature matching means 1321 evaluates that the position feature quantities match. That is, as with the position feature quantity, when the pixel value feature quantities substantially match, the pixel value feature matching means 1322 may evaluate that the pixel value feature quantities match. The pixel feature matching means 1322 outputs an evaluation result indicating whether or not the position feature quantities match to the feature point arrangement matching means 1323. Alternatively, the degree of similarity may be output as-is as the evaluation result.

The evaluation result output from the position feature matching means 1321 and the evaluation result output from the pixel value feature matching means 1322 are input to the feature point arrangement matching means 1323. The feature point arrangement matching means 1323 evaluates whether or not the first feature point arrangement and the second feature point arrangement are the same based on both of the evaluation results that have been input. For example, when both the position feature matching means 1321 and the pixel value feature matching means 1322 evaluate that there is a match, the feature point arrangement matching means 1323 evaluates that the feature point arrangements match.

Although this method is explained as an example in the following explanation of the operation, it is not limited to this method. For example, an appropriate function is determined in advance with variables, which are the degree of similarity output from the position feature matching means 1321 and the degree of similarity output from the pixel value feature matching means 1322. When a value output from the function as a result of fitting the degrees of similarity to the function is within the predetermined range, an evaluation may be made that the feature point arrangements match. That is, when the feature point arrangements substantially match, an evaluation may be made that the feature point arrangements match. The substantial match here indicates that the degree of matching between the position feature quantities is within a predetermined range including the case in which the position feature quantities completely match.

Note that this function outputs a value within the abovementioned predetermined range when the degree of similarity output from the position feature matching means 1321 is within the predetermined range, and further, the degree of similarity output from the pixel value feature matching means 1322 is within the predetermined range. Moreover, in this case, this function may output a value indicating whether or not the feature point arrangements match. The feature point arrangement matching means 1323 outputs a feature point arrangement matching result to outside. The feature point arrangement matching result is, for example, information indicating whether or not the feature point arrangements match.

The feature point group, the feature point arrangement, the position feature quantity, the pixel value feature quantity, the evaluation result, the feature point arrangement matching result and the like that are input and output by the abovementioned means are, to be precise, can be processed by the CPU 7.

Next, an entire operation of this exemplary embodiment is explained in detail with reference to the flowchart of FIG. 4.

First, the feature calculation means R131 calculates the first feature set from the first feature point arrangement input from the feature point numbering means R12 (step S101). The feature calculation means R131 outputs the calculated first feature set to the feature matching means 132. Next, the feature calculation means Q131 calculates the second feature set from the second feature point arrangement input from the feature point numbering means Q12 (step S102). The feature calculation means Q131 outputs the calculated second feature set to the feature matching means 132.

Next, the pixel value feature matching means 1322 evaluates whether or not the first pixel value feature quantity included in the first feature set and the second pixel value feature amount included in the second feature set are the same (step S103). When the first pixel value feature quantity and the second pixel value feature quantity are the same, the pixel value feature matching means 1322 outputs the evaluation result indicating a match in the pixel value feature quantities to the feature point arrangement matching means 1323. Then, the position feature matching means 1321 performs the step S104. When the first pixel value feature quantity and the second pixel value feature quantity are not the same, the pixel value feature matching means 1322 outputs the evaluation result indicating a mismatch in the pixel value feature quantities to the feature point arrangement matching means 1323. Then, the feature point arrangement matching means 1323 outputs the feature point arrangement matching result indicating a "mismatch" to outside (step S106).

In the step S104, the position feature matching means 1321 evaluates whether or not the first position feature quantity included in the first feature set and the second position feature quantity included in the second feature set are the same (step S104). When the first position feature quantity and the second position feature quantity are the same, the position feature matching means 1321 outputs the evaluation result indicating a match in the position feature quantities to the feature point arrangement matching means 1323. Then, the feature point arrangement matching means 1323 outputs the feature point arrangement matching result indicating a "match" to outside (step S105). When the first position feature quantity and the second position feature quantity are not the same, the position feature matching means 1321 outputs the evaluation result indicating a mismatch in the position feature quantities to the feature point arrangement matching means 1323. Then, the feature point arrangement matching means 1323 performs the abovementioned step S106.

Note that the operation of this exemplary embodiment should only operate in such a manner that when there is a match in both the pixel value feature quantities and the position feature quantities, an evaluation may be made that there is a match in the feature point arrangements, otherwise, an evaluation is made that there is a mismatch in the feature point arrangements, and the order of the abovementioned processes may be changed or the processes may be executed in parallel. For example, after the feature calculation means Q131 calculates the second feature set, the feature calculation means R131 may calculate the first feature set, or the calculation may be performed in parallel. Further, after the position feature matching means 1321 evaluates whether or not the position feature quantities match, the pixel value feature matching means 1322 may evaluate whether or not the pixel value feature quantities match, or the evaluation may be performed in parallel.

Note that in this exemplary embodiment, although the evaluation of the position feature quantities is performed when the pixel value feature quantities match, the pixel value feature matching means 1322 may output the evaluation result indicating a match in the pixel value feature quantities to the position feature matching means 1321, and in response to the evaluation result, the position feature matching means 1321 may evaluate the position feature quantities. The same holds true for the case in which the evaluation of the pixel value feature quantities is performed when the position feature quantities match.

Moreover, although this exemplary embodiment illustrated the case of calculating the first position feature quantity and the second feature quantity to include the feature quantities in the order that is ordered in the feature point arrangement, it is not limited to this. Values included in both of the position feature quantities should only be associated to enable comparison between the first position feature quantity and the second position feature quantity. However, preferably, as with this exemplary embodiment, calculating the first position feature quantity and the second position feature quantity under similar rules facilitates comparison between the first position feature quantity and the second position feature quantity, thereby enabling reduction in the amount of processing by the position feature matching means 1321. The same holds true for the pixel value feature quantity.

Moreover, the configuration and operation of this exemplary embodiment may be changed as described below in the case of matching each one or more feature point arrangements calculated from the first image against one or more feature point arrangements calculated from the second image in a round robin fashion. Specifically, firstly the first feature set is calculated from one or more feature point arrangements regarding the first image and stored to the storage medium 8. Then, every time the second feature set is calculated for each of the feature point arrangement regarding the second image, each of the first feature set may be read from the storage medium 8 to match against the calculated second feature set.

Next, an exemplary advantage of this exemplary embodiment is explained. This exemplary embodiment has a configuration in which the first position feature quantity, the first pixel value feature quantity, the second position feature quantity, and the second pixel value feature quantity are calculated from the first feature point arrangement and the second feature point arrangement, and a match in the feature point arrangements is evaluated using these quantities. The pixel value feature quantity here uses a sequence of pixel values when the feature point arrangements are ordered by some sort of method. This method is thus capable of matching the feature point arrangements more accurately than the method of using only the positions of the feature points.

The reason for this is that the method of this exemplary embodiment evaluates whether or not the provided two feature point arrangements match using not only the feature point groups or the positions of the feature points in the feature point arrangements but also the pixel values of the feature points, even when there is an influence of the geometric transformation with greater flexibility such as the two-dimensional affine transformation and the two-dimensional projection transformation.

Second Exemplary Embodiment

Next, a second exemplary embodiment of the present invention is explained in detail with reference to the drawings. Since the second exemplary embodiment of the present invention is common in many points to the first exemplary embodiment of the present invention, a difference is focused in the explanation.

A difference of the configuration according to the second exemplary embodiment of the present invention from the configuration according to the first exemplary embodiment of the present invention is that a pixel value feature calculation means R2313 is included instead of the pixel value feature calculation means R1312, and the pixel value feature calculation means Q2313 is included instead of the pixel value feature calculation means Q1312. In connection with this, the feature calculation means R131 is replaced with feature calculation means R231, and Q131 is changed to Q231. Note that the feature calculation means Q231 and the pixel value feature calculation means Q2312 are similar to the feature calculation means R231 and the pixel value feature calculation means R2312, the explanation and illustration thereof is not provided.

Figure 5:
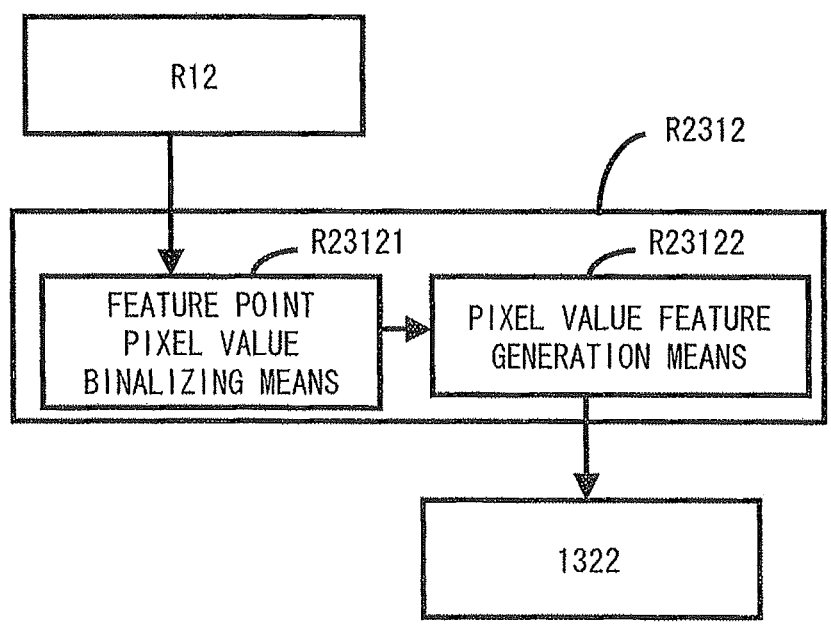
FIG. 5 is a block diagram showing a configuration of pixel value feature calculation means R2312 according to a second exemplary embodiment of the present invention.

FIG. 5 is a block diagram showing a configuration of the pixel value feature calculation means R2312 according to the second exemplary embodiment of the present invention. The pixel value feature calculation means R2312 according to this exemplary embodiment is configured to have limited kinds of pixel value features that are calculated by the pixel value feature calculation means R1312 of the first exemplary embodiment. Specifically, the pixel value feature calculation means R2312 is composed of feature point pixel value binarizing means R23121 and pixel value feature generation means R23122.

The feature point pixel value binarizing means R23121 binarizes the pixel value of the feature point belonging to the feature point arrangement that is input from the feature point numbering means R12. For example, when the pixel value of the feature point is a luminance value, a value obtained by binarizing the luminance value by a known method may be used. When the pixel value is expressed as a point in the color space, such as RGB, XYZ, and HSV, a one-dimensional numerical value may be calculated by a previously provided function, the numerical value may be binarized, and the obtained value may be used.

Alternatively, clustering may be performed using a known method in the color space and an evaluation may be made whether or not the pixel value belongs to an appropriate one or more clusters to determine the pixel value to be either or the two values. Note that when it is known beforehand that the pixel values are binarized, this means is not necessarily required.

The pixel value feature generation means R23122 uses results of binarizing the pixel values of the provided feature point arrangement to generate the pixel value feature quantities. Specifically, the pixel value feature generation means R23122 may arrange the results of binarizing the pixel values of the feature points in the order of the feature points belonging to the feature point arrangement.

Figure 6:
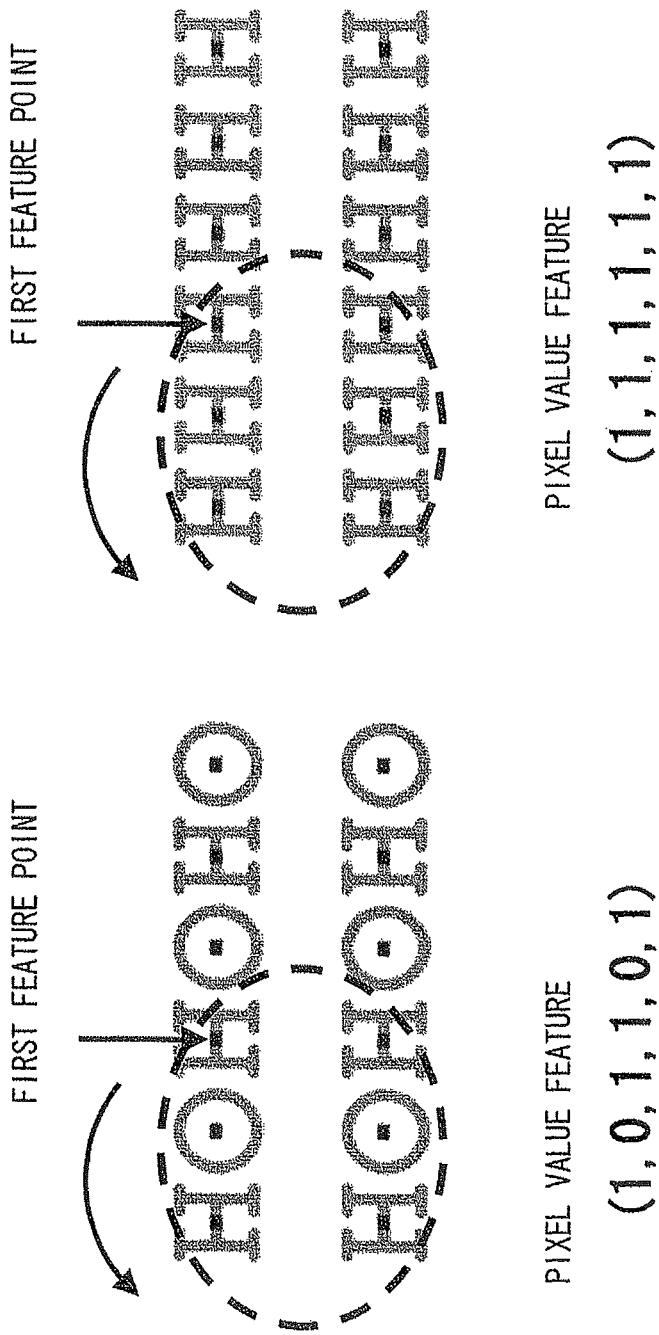
FIG. 6 is a diagram showing an example of a pixel value feature quantity calculated by the pixel value feature calculation means R2312 according to the second exemplary embodiment of the present invention.

FIG. 6 is a diagram showing an example of the pixel value feature quantity calculated by the pixel value feature calculation means R2312. The black dots in FIG. 6 represent the positions of the feature points. Referring to FIG. 6, the results of binarizing the pixel values of the feature points are expressed in the form of a bit sequence. Suppose that the feature point arrangement includes m points, the pixel value feature can express mth power of two variations. Moreover, in this pixel value feature, one feature point includes only one bit as the amount of information, thus the pixel value feature can be considered to have a compact feature quantity. For example where $m \leq 8$, the pixel value features can be stored to a variable with a storage capacity of one byte.

An operation of the second exemplary embodiment of the present invention is essentially the same as the operation according to the first exemplary embodiment of the present invention, thus the explanation is not provided here.

Next, an exemplary advantage of this exemplary embodiment is explained. This exemplary embodiment has a configuration to calculate the bit sequence that expresses the pixel values of the feature points by either of the two values as the pixel feature value. For example, in the case where m as mentioned above, the pixel value features can be stored to a variable with a storage capacity of one byte, the evaluation of whether or not the pixel value features match may be based on the evaluation of whether or not the one byte variables match. As described above, since the pixel value feature calculated in this exemplary embodiment has a compact feature quantity, high-speed matching can be realized.

Figure 4:
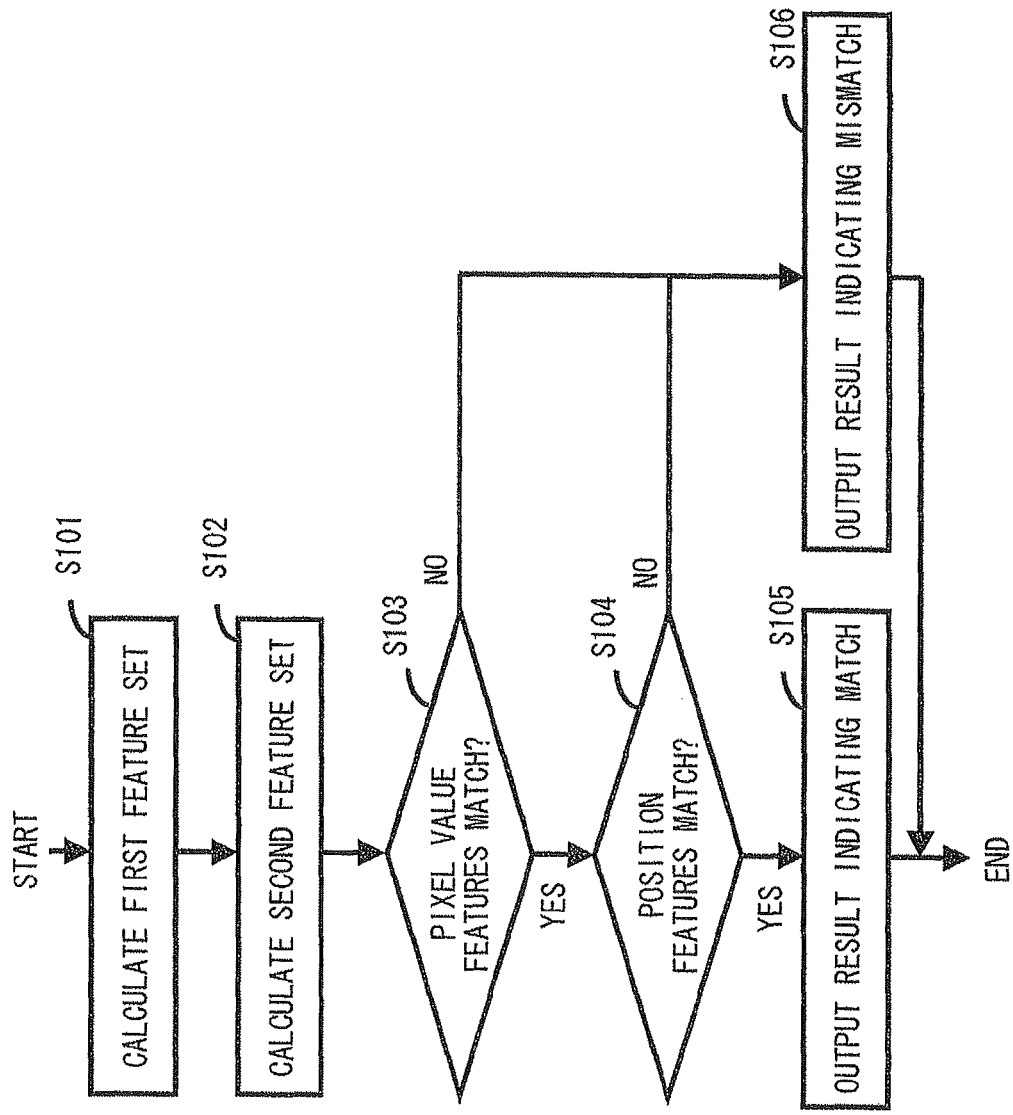
FIG. 4 is a flowchart showing an operation of the feature point matching device according to the first exemplary embodiment of the present invention.

Moreover, it should be noted here that as shown in FIG. 4, in view of high-speed matching of the feature point arrangements, it is especially preferable to match the position features after matching the pixel value features. This is owing to high-speed matching of the pixel value features. Reducing the processing time for matching the entire feature point arrangements is especially effective when it takes time to match the position features.

Note that although this exemplary embodiment illustrated the example of binarizing the pixel values, the pixel values may be converted into a plurality of values other than binary. For example, the pixel value may be converted into four values. For example, in the case in which the original pixel value is expressed in 0 to 255, by converting the pixel value into four values, which is less than the number of original values, the amount information can be reduced, thereby realizing high-speed matching.

Third Exemplary Embodiment

Next, a third exemplary embodiment of the present invention is explained. First, background for explaining this exemplary embodiment is stated. For example, in the case of carrying out the second exemplary embodiment of the present invention, consider a case in which there are p1 first feature point arrangements and p2 second feature point arrangements to be matched, and an evaluation is made whether or not there are matches in all combinations of the first feature point arrangements and the second feature point arrangements. In this example, p1 and p2 are any positive integers. In this case, matching evaluation for at least one of the position feature quantities and the pixel value feature quantities shall be always performed for p1×p2 times. For example, in the case of matching as shown in FIG. 4, matching of at least the pixel value features is performed for p1×p2 times. The same holds true for the first exemplary embodiment of the present invention. The third exemplary embodiment realizes faster processes as a whole by reducing the number of matching evaluation for the position feature quantities and the pixel value feature quantities.

Next, a configuration, an operation, and an exemplary advantage peculiar to this exemplary embodiment are explained in detail with reference to the drawings for the third exemplary embodiment of the present invention. Since this exemplary embodiment is common to the second exemplary embodiment of the present invention in many points, only the differences are explained.

Figure 7:
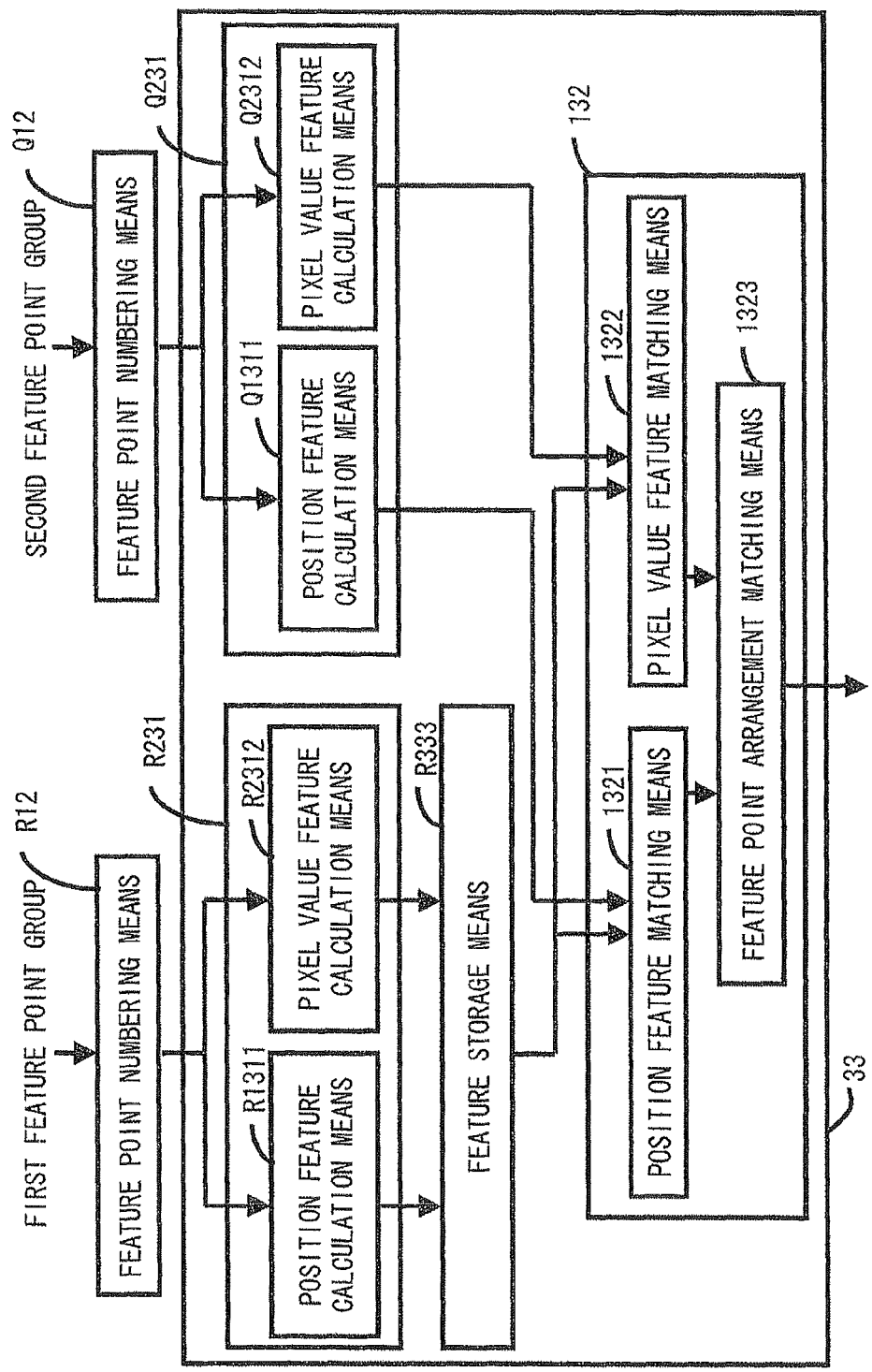
FIG. 7 is a block diagram showing a configuration of a feature point matching device according to a third exemplary embodiment of the present invention.

FIG. 7 is a diagram for explaining the configuration of the third exemplary embodiment of the present invention. Referring to FIG. 7, a difference from the second exemplary embodiment of the present invention is that feature storage means R333 is included.

Figure 8:
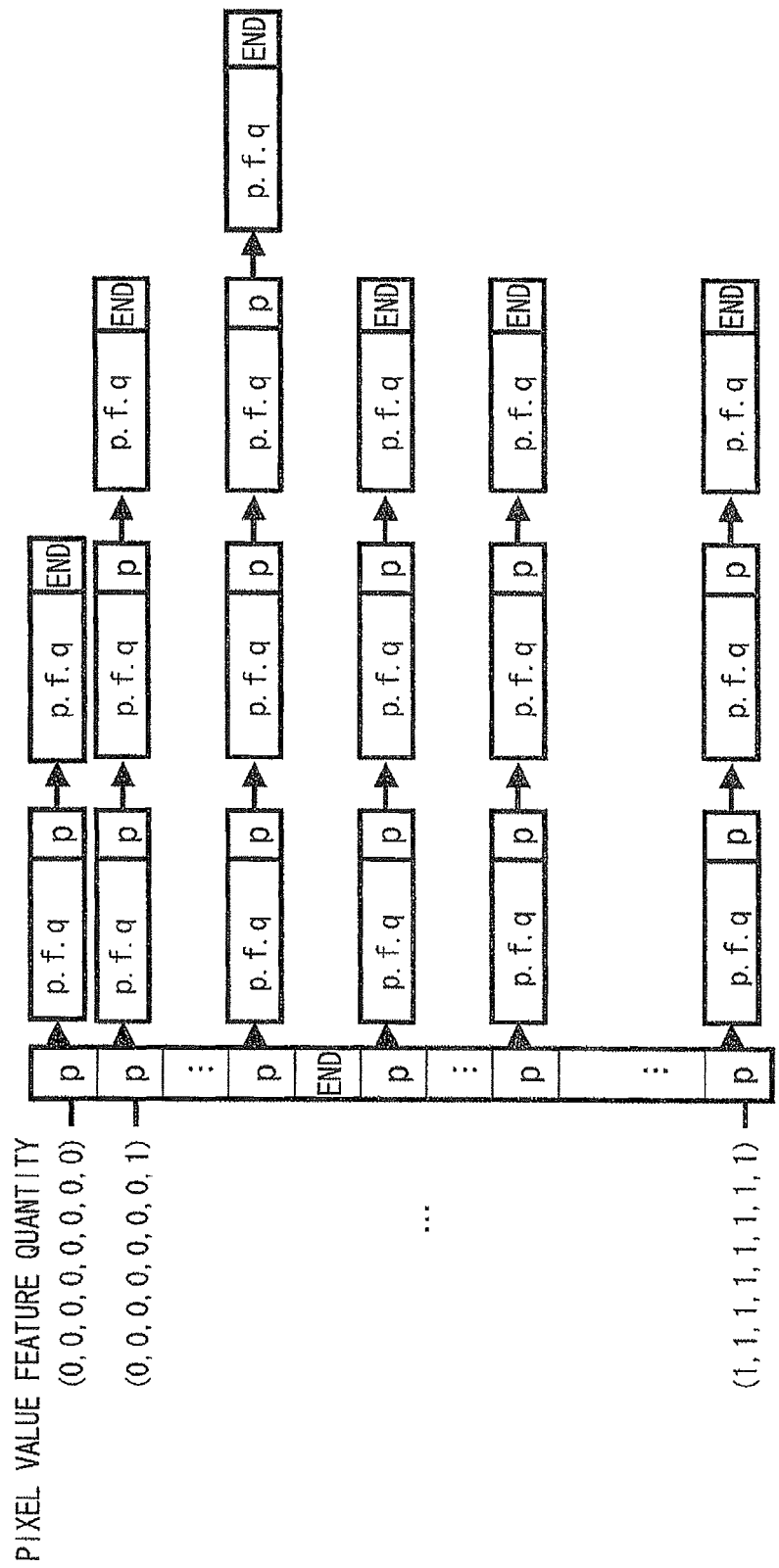
FIG. 8 is a diagram for explaining an example of a state of storing position feature quantities according to the third exemplary embodiment of the present invention.

Although the feature storage means R333 is typically mounted inside the storage medium 8, it is not limited to this. As for the feature storage means R333, the position feature quantity calculated by the position feature calculation means R1311 is stored based on the value of the pixel value feature quantity calculated by the pixel value feature calculation means R2312. FIG. 8 is a diagram for explaining an example of a state in which the position feature quantities are stored. Note that in FIG. 8, the position feature quantity is represented by "p.f.q". This example shows a state from an initial state in which no position feature quantity is stored to the storage of the position feature quantities in a list with the pixel feature quantities as indices and the position feature quantities as elements. In FIG. 8, "p" represents a pointer to a next element, and "E" is a pointer indicating an end. A method of storing the position feature quantities in this way is described later in the explanation of the operation.

Next, an operation according to the third exemplary embodiment of the present invention is explained. The operation of this exemplary embodiment is composed of a registration process SR3 and a search process SQ3. The registration process SR3 calculates in advance the first position feature quantities and the first pixel value feature quantities for all the first feature point arrangements and stores the first position feature quantities to the feature storage means R333. The search process SQ3 calculates the second position feature quantity and the second pixel value feature quantity for the second feature point arrangement. Then, the search process SQ3 matches the calculated second pixel value feature quantity and the first pixel value feature quantity stored to the feature storage means R333 so as to match the first feature arrangement and the second feature arrangement. Hereinafter, the registration process SR3 and the search process SQ3 are explained in detail.

Figure 9:
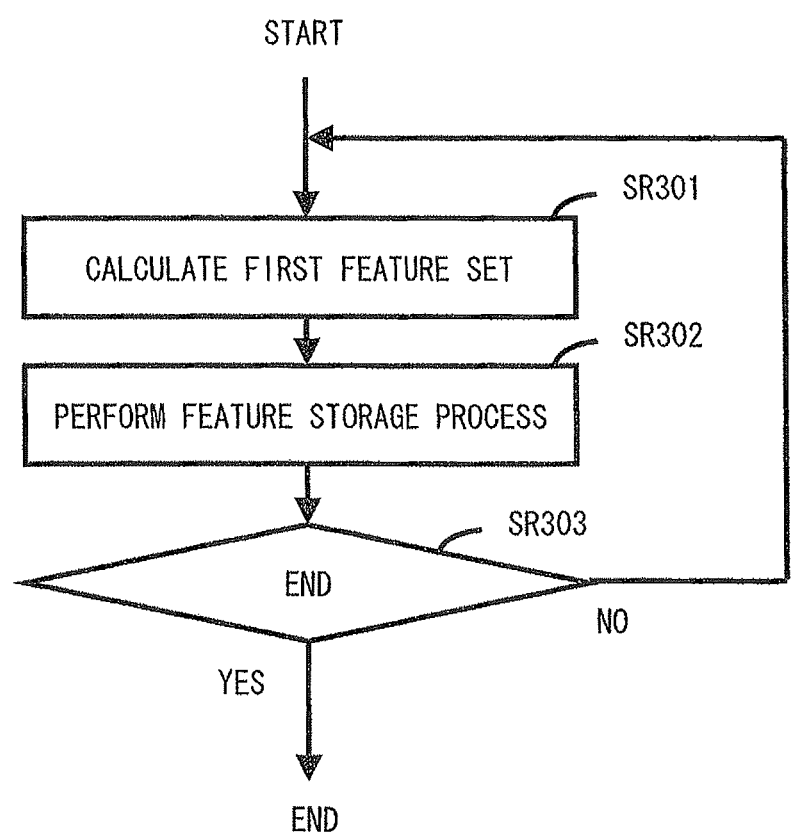
FIG. 9 is a flowchart showing an operation of a registration process SR3 according to the third exemplary embodiment of the present invention.

FIG. 9 is a flowchart for explaining an operation of the registration process SR3. First, the feature calculation means R231 calculates the first feature set (the first position feature quantity and the first pixel value feature quantity) for one of p1 first feature point arrangements (step SR301).

Next, the feature calculation means R231 stores the calculated first position feature quantity to the feature storage means R333 (step SR302). The first position feature quantity at this time is connected to the end of the list with the calculated first pixel value feature quantity as an index. That is, following steps SR3021 to SR3023 should be executed in order in the step SR302. Note that the processes from the steps SR3021 to SR3023 are not shown.

First, the feature calculation means R231 finds the end of the list with the calculated first pixel value feature quantity as an index (step SR3021). The feature calculation means R231 adds the first position feature quantity to the end of the list (step SR3022). The feature calculation means R231 adds a pointer indicating an end to the element (step SR3023). The feature calculation means R231 further updates the pointer of the element that is previous to the added element to a pointer to the newly added element. When the step SR302 is completed, the feature calculation means R231 evaluates whether or not the calculation of the feature quantities has completed for all the first feature point arrangements (step SR303). When the calculation of the feature quantities has completed for all the feature point arrangements, the feature calculation means R231 ends the registration process SR3. Otherwise, the feature calculation means R231 performs the processes from the steps SR301 to SR303 for the first feature point arrangement in which the first position feature quantity has not been stored yet.

Figure 10:
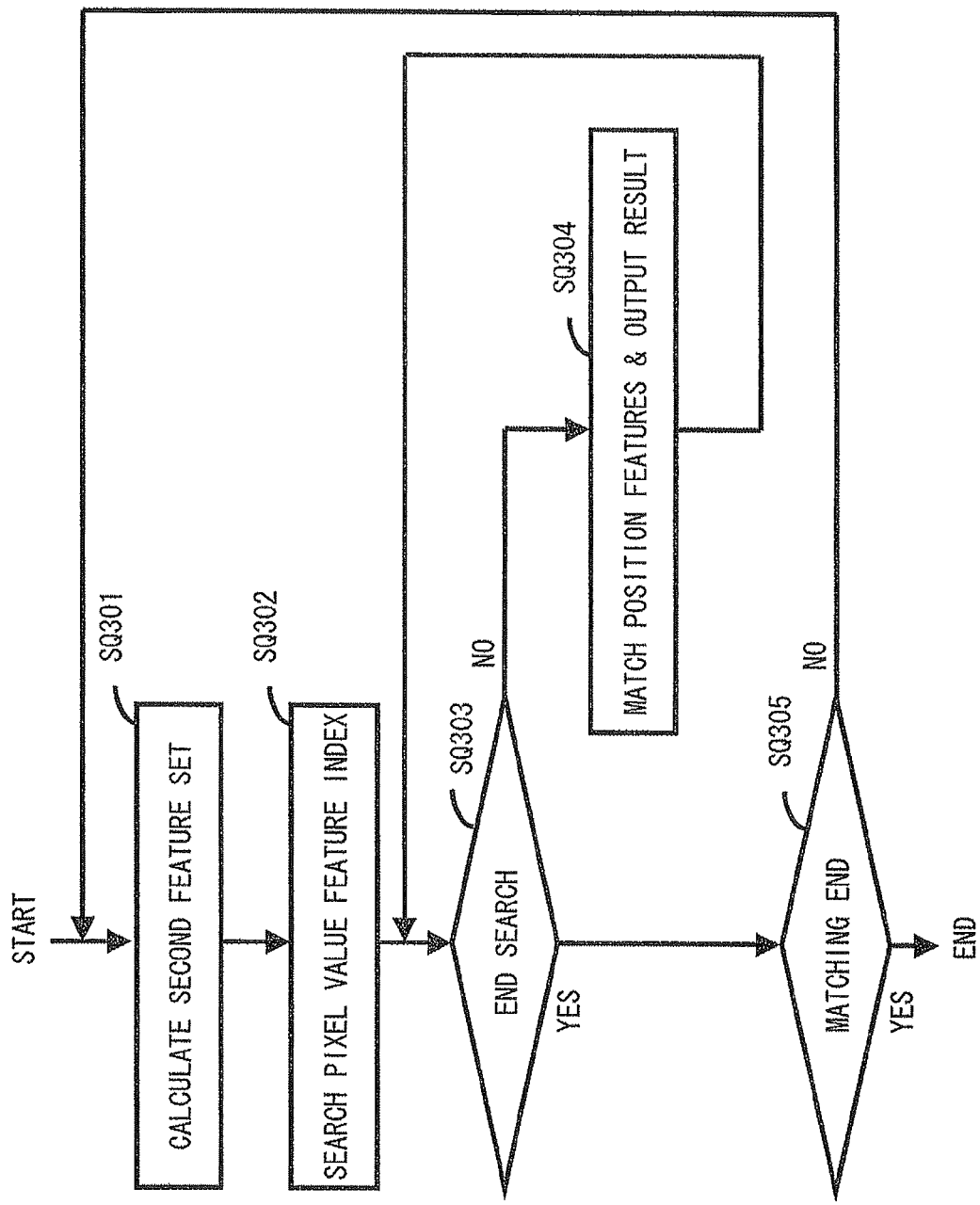
FIG. 10 is a flowchart showing an operation of a search process SQ3 according to the third exemplary embodiment of the present invention.

Next, an operation of the search process SQ3 is explained. FIG. 10 is a flowchart for explaining the operation of the search process SQ3. Referring to FIG. 10, first the feature calculation means Q231 calculates the second feature set (the second position feature quantity and the second pixel value feature quantity) for one of p2 second feature point arrangements (step SQ301). Next, the feature calculation means Q231 stores the calculated second position feature quantity to the feature matching means 132.

Subsequently, the pixel value feature matching means 1322 searches in the list stored to the feature storage means R333 for the index of the first pixel feature quantity that matches the second pixel value feature quantity included in the second feature set output from the feature calculation means Q231. When the pixel value feature matching means 1322 detects the index that matches the second pixel value feature quantity, the pixel value feature matching means 1322 outputs the detected index to the position feature matching means 1321. Further, in this case, when the pointer to a first element in the list with the detected index is not an end, the pixel value feature matching means 1322 outputs an evaluation result indicating a match in the pixel value feature quantities to the feature point arrangement matching means 1323. On the contrary, when the pointer to the first element in the list with the detected index is an end, the pixel value feature matching means 1322 outputs the evaluation result indicating a mismatch in the pixel value feature quantities to the feature point arrangement matching means 1323. This is because that when the first position feature quantity is not stored to the list, it means that the first feature point arrangement does not exist for which the first pixel value feature quantity to be an index of the list is calculated.

The position feature matching means 1321 obtains the pointer to the first element in the list with the index output from the pixel value feature matching means 1322 and uses obtained pointer to the first element as the pointer to the next element (step SQ302).

Next, the position feature matching means 1321 evaluates whether the obtained pointer to the next element is an end (step SQ303). When the pointer to the next element is an end, the position feature matching means 1321 ends searching in the list and performs the process of the step SQ305. Otherwise, the position feature matching means 1321 performs the process of the step SQ304.

In the process of the step SQ304, the position feature matching means 1321 matches the first position feature quantity stored to the next element and the second position feature quantity included in the second feature set that is output from the feature calculation means Q231 and outputs an evaluation result to the feature point arrangement matching means 1323. Next, the position feature matching means 1321 obtains the pointer added to the matched first feature quantity as the pointer to the next element. Then, the position feature matching means 1321 performs the process of the step SQ303 again.

The step SQ305 evaluates whether or not matching is completed for all the second feature point arrangements. When matching is completed for all the second feature point arrangements, the search process SQ3 ends. When the matching is not completed for all the second feature point arrangements, the process of SQ301 is performed for the second feature point arrangement that has not been matched yet. That is, the feature matching means 132 obtains from the feature calculation means Q231 the second feature set calculated from the second feature point arrangement which has not been matched and continues the search process SQ3.

Next, an exemplary advantage of this exemplary embodiment is explained. This exemplary embodiment has a configuration in which, in the registration process, the position features are categorized based on the indices and stored, and in the search process, only the position feature quantity of the feature set with the index matching with the pixel value feature quantity is matched, so as to match the feature point arrangements. This enables faster matching than the first and second exemplary embodiments of the present invention.

More specifically, in the second exemplary embodiment, matching evaluation for the position feature quantities and the pixel value feature quantities is performed for; the number of the first feature point arrangements p1×the number of the second feature point arrangements p2. However, in the third exemplary embodiment, the number of matching evaluation for the pixel value feature quantities is only the number of comparison until the index with the matching pixel value feature quantity is detected, and the number of matching evaluation for the position feature quantities is only the number of elements included in the detected index. This enables reduction in the number of matching evaluation for the pixel value feature quantities and the position feature quantities. The greater the number of the first feature point arrangements and the number of the second feature point arrangements, the greater the reduction in the number of matching evaluation.

Although in the third exemplary embodiment, the position feature quantities are categorized based on the values of the pixel value feature quantities, the pixel value feature quantities may be categorized based on the values of the position feature quantities. Moreover, upon mounting, in the storage medium 8, when the position feature quantity is already stored to the storage medium 8, the list may be composed using the pointer to a position feature storage region in the storage medium 8.

Further, also in the third exemplary embodiment of the present invention in a similar manner as the first exemplary embodiment, when the second pixel value feature quantity and the first pixel value feature quantity to be the index substantially match, an evaluation may be made that there is a match in the pixel value feature quantities. That is, the pixel value feature matching means 1322 may detect the index of the first pixel value feature quantity that substantially matches the second pixel value feature quantity from the list stored to the feature storage means R333. Moreover, also for the position feature quantity, when the first position feature quantity substantially matches the second position feature quantity, an evaluation may be made that there is a match in the position feature quantities.

Additionally, although the third exemplary embodiment of the present invention illustrated the case of using the pixel value feature quantity obtained by binarizing the pixel value as the index of the list, it is not limited to this. For example, a pixel value feature quantity obtained by converting the pixel value into a plurality of values other than binary may be used as the index or a pixel value feature quantity with the pixel value not converted into a plurality of values may be used as the index.

The feature point arrangement matching device 13 of each exemplary embodiment described above can be used as one function in the image matching device.

This is because that as described in background, there has been a technique that includes the feature point arrangement function as one function in the image matching device. For example, it is obvious that the feature point arrangement function can be used as one function in the image matching device, as disclosed in patent literature 1.

Figure 11:
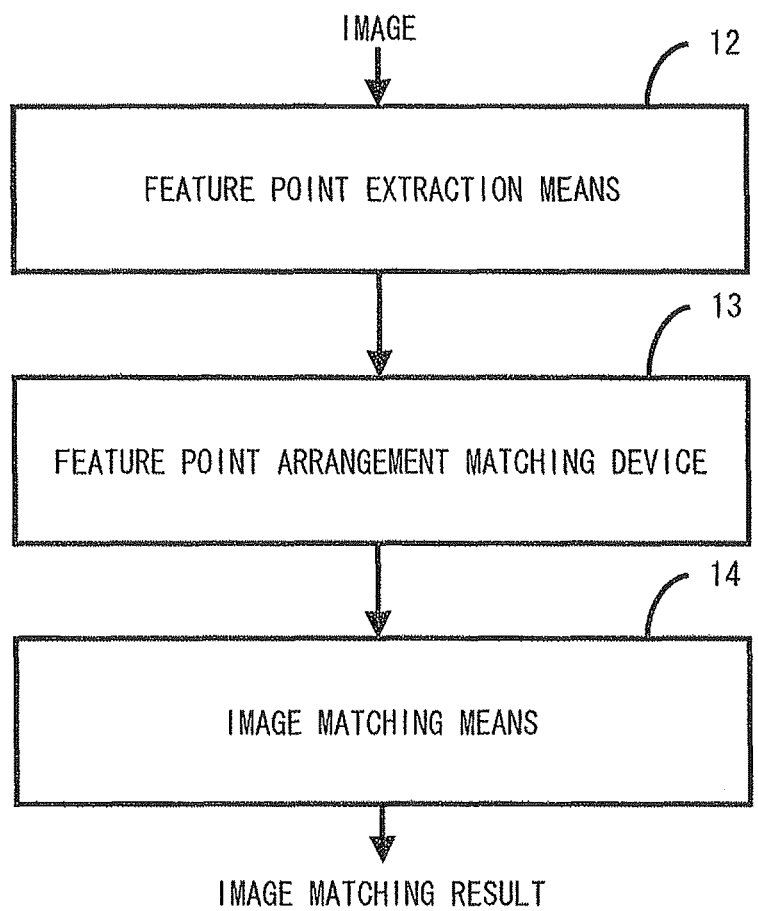
FIG. 11 is a block diagram showing a configuration example of an image matching device according to an exemplary embodiment of the present invention.

For example, as illustrated in FIG. 11, the image matching device can be configured including the feature arrangement matching device 13 according to this exemplary embodiment. This image matching device includes feature point extraction means 12, the feature point arrangement matching device 13 according to this exemplary embodiment, and an image matching means 14.

The image matching device supplies the feature point extraction means 12 with a first image and a second image to match the first image and the second image. The feature point extraction means 12 extracts feature points from the first image and calculates a first feature point group. The feature point extraction means 12 further extracts feature points from the second image and calculates a second feature point group. The feature point extraction means 12 outputs the calculated first feature point group and the calculated second feature point group to the feature point arrangement matching device 13.

The image matching means 14 matches the first image and second image based on the feature point arrangement matching result output from the feature point arrangement matching device 13. Specifically, when the feature point arrangement matching result indicates a match in the first feature point arrangement and the second feature point arrangement, the image matching means 14 estimates a content of geometric transformation between the first image and the second image based on the first feature point arrangement and the second feature point arrangement. The first feature point arrangement and the second feature point arrangement used for estimating the content of the geometric transformation are, for example, output from the feature point arrangement matching device 13 to the image matching means 14. The content of geometric transformation is, for example, a geometric transformation parameter in a mathematical expression used to transform the first image and the second image mutually. The image matching means 14 matches the first image and second image based on the estimated content of geometric transformation.

Specifically, to match the images, the image matching means 14 projects any first region included in the first image on the second image based on the content of geometric transformation. That is, the image matching means 14 identifies a second region corresponding to the first region included in the first image. The image matching means 14 calculates the feature quantity of the first region and the feature quantity of the second region and compares the feature quantity of the first region and the feature quantity of the second region so as to evaluate whether or not there is a match in the first image and the second image. At the time of calculating the feature quantity of the second region, it is preferable to deform the image specified by the second region to be the same shape as the first region based on the content of geometric transformation before calculating the feature quantity of the second region. The feature quantity of the region may be any value as long as it is a value describing a feature of the region. The feature quantity of the region may be, for example as disclosed in patent literature 1, a proportion of non-background pixels or a value obtained by dividing a sum of the pixel values in the partial region by a region area.

This realizes the image matching device that is robust against the geometric transformation such as the affine transformation and the projective transformation.

The reason is as follows. For example, the unit of matching is a local region in the method disclosed in patent literature 4. However, the features extracted from the local region are susceptible to the affine transformation and the projective transformation. In other words, the features extracted from the local region in the first image tend to differ from the features extracted from the local region in the second image. Therefore, matching local regions is susceptible to the affine transformation and the projective transformation.

Meanwhile, the feature point arrangement matching device according to the abovementioned exemplary embodiments of the present invention uses the pixel values at the plurality of feature point positions belonging to the feature point arrangement for matching the feature point arrangements. The pixel value of a certain target point in the first image ideally matches the pixel value of a point in the second image corresponding to the target point in the first image.

For example, the image matching device disclosed in patent literature 1 calculates the geometric transformation parameter based on the feature point arrangement matching result and projects and matches the images using the calculated geometric transformation parameter for each partial region. Therefore, applying the feature point arrangement matching device 13 of this exemplary embodiment enables the image matching to be robust against the affine transformation and the projective transformation.

Figure 12:
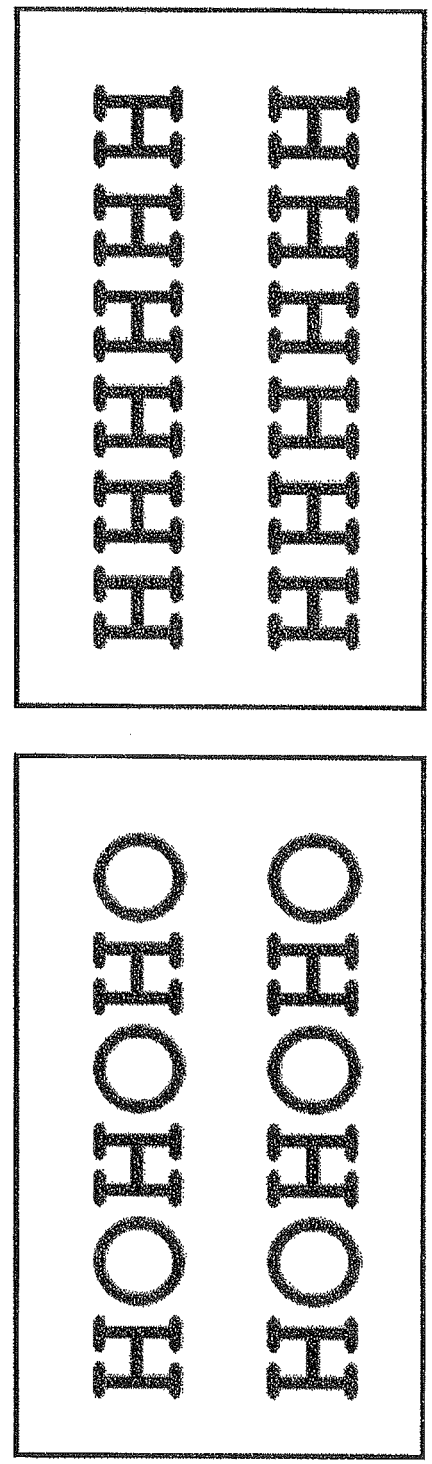
FIG. 12 is an example of two different kinds of images for explaining a problem to be solved by the invention.
Figure 13:
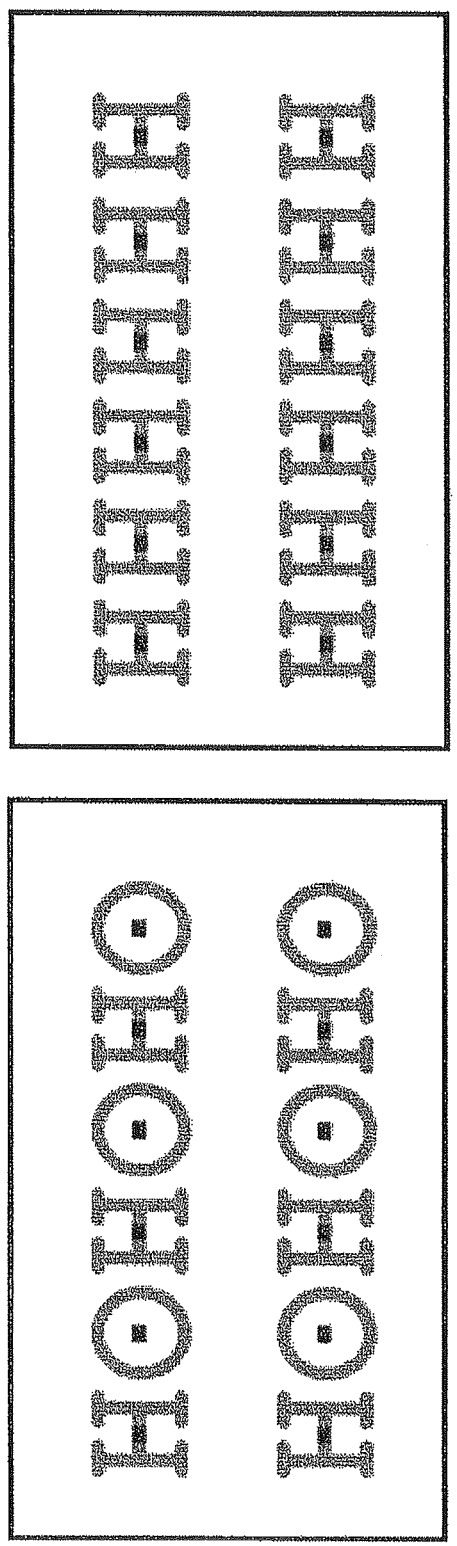
FIG. 13 is a conceptual diagram for explaining a state of extracting feature points from both two different kinds of images shown in FIG. 12.

Matching the centroid point of a connected region as the feature point is preferable in matching string images. This is because that in the string image, it is easy to calculate the connected region. Since the centroid point is essentially shifted by the projective transformation, there is fear that matching accuracy is adversely affected. However, characters have various shapes. For example, as with H and O shown in FIG. 12, there are characters with the pixel values at centroid coordinates that can likely be the color of the shape (character) and the pixel values at centroid coordinates that can likely be the background color. Therefore, when the string image with a single-color background is subject to be matched and the centroid is used as a feature point in the matching, it is unlikely that the image is complicated enough to cause a large change in the pixel value by a slight shift of the centroid due to the projective transformation.

The explanation above has been presented with an example of incorporating various means in the form of software in the abovementioned exemplary embodiments illustrating the feature point arrangement matching device and the image matching device. However, it is also possible to configure a part or all of the means by hardware.

The present invention can be applied to uses such as an information search device that searches for the same or similar image as the search image from images that are stored previously to a database. Moreover, the present invention can also be applied to an electronic voting device as the one disclosed in Japanese Unexamined Patent Application Publication No. 2010-224943.

Although the present invention has been explained with reference to the exemplary embodiments, the present invention is not limited by above. Various modifications, obvious to those skilled in the art, can be made to the configurations and details of the present invention within the scope of the invention.

A program for realizing the above mentioned various means according to the exemplary embodiments of the present invention can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, the exemplary embodiments of the present invention includes not only the cases in which the functions of the above exemplary embodiments are realized by a computer executing a program that realizes the functions of the above exemplary embodiment, but also the cases in which this program realizes the functions of the above exemplary embodiments in cooperation with OS (Operating System) or application software operating on the computer. Furthermore, the exemplary embodiments of the present invention also includes the case of realizing the functions of the above exemplary embodiments by a function extension board inserted into a computer executing a part or all of the processes in this program.

The present application claims priority rights of and is based on Japanese Patent Application No. 2011-037069 filed on Feb. 23, 2011 in the Japanese Patent Office, the entire contents of which are hereby incorporated by reference.

REFERENCE SIGNS LIST 1, 13 FEATURE POINT ARRANGEMENT MATCHING DEVICE
5 FEATURE POINT MATCHING DEVICE
7 CPU
8 STORAGE MEDIUM
9 INPUT AND OUTPUT INTERFACE
51 POSITION FEATURE GENERATION MEANS
52 PIXEL VALUE FEATURE GENERATION MEANS
53, 132 FEATURE MATCHING MEANS
1321 POSITION FEATURE MATCHING MEANS
1322 PIXEL VALUE FEATURE MATCHING MEANS
R131, Q131, R231, Q231, R331, and Q331 FEATURE CALCULATION MEANS R333 FEATURE STORAGE MEANS
R1311, Q1311 POSITION FEATURE CALCULATION MEANS
R1312, Q1312, R2312, Q2312 PIXEL VALUE FEATURE CALCULATION MEANS
R23121 FEATURE POSITION PIXEL VALUE BINARIZING MEANS
R23122 PIXEL VALUE FEATURE GENERATION MEANS

The invention claimed is:

1. A feature point matching device, comprising:
a position feature generation unit that generates a position feature quantity for at least one feature point based on a position of the at least one feature point included in an image;
a pixel value feature generation unit that generates a pixel value feature quantity for the at least one feature point based on a pixel value of the at least one feature point included in the image; and
a feature matching unit that matches at least one first feature point and at least one second feature point by evaluating whether or not a first position feature quantity matches a second position feature quantity and whether or not a first pixel value feature quantity matches a second pixel value feature quantity, the first position feature quantity being generated by the position feature generation unit from the at least one first feature point included in a first image, the second position feature quantity being generated by the position feature generation unit from the at least one second feature point included in a second image, the first pixel value feature quantity being generated by the pixel value feature generation unit from the at least one first feature point, and the second pixel value feature quantity being generated by the pixel value feature generation unit from the at least one second feature point,
wherein the pixel value feature quantity includes the pixel value of the at least one feature point.

2. The feature point matching device according to claim 1, wherein the pixel value feature generation unit converts a pixel value of the feature point into a plurality of values and generates the pixel value feature quantity indicating the pixel value of the feature point that has been converted into the plurality of values.

3. The feature point matching device according to claim 1, wherein the at least one feature point comprises a feature point set including a plurality of the feature points,
wherein the image includes a plurality of the feature point sets,
wherein the position feature generation unit generates the position feature quantity for each of the plurality of feature point sets, and
wherein the pixel value feature generation unit generates the pixel value feature quantity for each of the plurality of feature point sets.

4. The feature point matching device according to claim 3, wherein the feature point matching device further comprises a feature storage unit that stores association information, the association information associating a first reference pixel value feature quantity and the first position feature quantity, the first reference pixel value feature quantity being a predetermined first pixel value feature quantity, the first position feature quantity being generated from a first feature point set from which the first pixel value feature quantity evaluated to have matched the first reference pixel value feature quantity is generated,
wherein the position feature generation unit associates, when the position feature generation unit generates the first position feature quantity from the feature point set from which the first pixel value feature quantity evaluated to have matched the first reference pixel value feature quantity is generated, the first reference pixel value feature quantity and the generated first position feature quantity in the association information, and
wherein the feature matching unit detects the first reference pixel value feature quantity evaluated to have matched the second pixel value feature quantity, evaluates whether or not the first position feature quantity associated with the detected first reference pixel value feature quantity matches the second position feature quantity generated from the feature point set from which the second pixel value feature quantity is generated so as to match the first feature point set and the second feature point set, or
wherein the feature point matching device further comprises a feature storage unit that stores association information, the association information associating a first reference position feature quantity and the first pixel value feature quantity, the first reference position feature quantity being the predetermined first position feature quantity, the first pixel value feature quantity being generated from a first feature point set from which the first position feature quantity evaluated to have matched the first reference position feature quantity is generated,
wherein the pixel value feature generation unit associates, when the pixel value feature generation unit generates the first pixel value feature quantity from the feature point set from which the first position feature quantity evaluated to have matched the first reference position feature quantity is generated, the first reference position feature quantity and the generated first pixel value feature quantity in the association information, and
wherein the feature matching unit detects the first reference position feature quantity evaluated to have matched the second position feature quantity, evaluates whether or not the first pixel value feature quantity associated with the detected first reference position feature quantity matches the second pixel value feature quantity generated from the feature point set from which the second position feature quantity is generated so as to match the first feature point set and the second feature point set.

5. The feature point matching device according to claim 3, wherein the feature point set comprises a feature point arrangement including the plurality of feature points arranged in a predetermined order, wherein the position feature generation unit generates the position feature quantity including values based on the positions of the feature points arranged in the predetermined order, and wherein the pixel value feature generation unit generates the pixel value feature quantity including values based on the pixel values of the feature points arranged in the predetermined order.

6. The feature point matching device according to claim 1, wherein the position feature generation unit includes a first position feature generation unit that generates the first position feature quantity and a second position feature generation unit that generates the second position feature quantity in parallel to the generation of the first feature quantity by the first position feature generation unit, and wherein the pixel value feature generation unit includes a first pixel value feature generation unit that generates the first pixel value feature quantity and a second pixel value feature generation unit that generates the second pixel value feature quantity in parallel to the generation of the first pixel value feature quantity by the first pixel value feature generation unit.

7. The feature point matching device according to claim 1, further comprising an image matching unit that, upon an evaluation that the at least one first feature point and the at least one second feature point match, estimates a transformation content between the first image and the second image based on the at least one first feature point and the at least one second feature point and matches the first image and the second image based on the estimated transformation content.

8. The feature point matching device according to claim 7, wherein the image matching unit identifies a second region in the second image that corresponds to a first region included in the first image based on the estimated transformation content and compares a feature quantity of the first region and a feature quantity of the second region to match the first image and the second image.

9. A method of matching a feature point, the method comprising:

generating a first position feature quantity for at least one first feature point based on a position of the at least one first feature point included in a first image, generating a first pixel value feature quantity for the at least one first feature point based on a pixel value of the at least one first feature point, generating a second position feature quantity for at least one second feature point based on a position of the at least one second feature point included in a second image, and generating a second pixel value feature quantity for the at least one second feature point based on a pixel value of the at least one second feature point; and matching the at least one first feature point and the at least one second feature point by evaluating whether or not the first position feature quantity matches the second position feature quantity and whether or not the first pixel value feature quantity matches the second pixel value feature quantity, wherein the first pixel value feature quantity includes the pixel value of the at least one first feature point, and wherein the second pixel value feature quantity includes the pixel value of the at least one second feature point.

10. A non-transitory computer readable medium storing a feature point matching program for causing computer to execute:

generating a first position feature quantity for at least one first feature point based on a position of the at least one first feature point included in a first image, generating a first pixel value feature quantity for the at least one first feature point based on a pixel value of the at least one first feature point, generating a second position feature quantity for at least one second feature point based on a position of the at least one second feature point included in a second image, and generating a second pixel value feature quantity for the at least one second feature point based on a pixel value of the at least one second feature point; and matching the at least one first feature point and the at least one second feature point by evaluating whether or not the first position feature quantity matches the second position feature quantity and whether or not the first pixel value feature quantity matches the second pixel value feature quantity, wherein the first pixel value feature quantity includes the pixel value of the at least one first feature point, and wherein the second pixel value feature quantity includes the pixel value of the at least one second feature point.

11. The feature point matching device according to claim 3, wherein the feature point matching device further comprises a feature storage unit that stores association information, the association information associating a first reference position feature quantity and the first pixel value feature quantity, the first reference position feature quantity including a predetermined first position feature quantity, the first pixel value feature quantity being generated from a first feature point set from which the first position feature quantity evaluated to have matched the first reference position feature quantity is generated.

12. The feature point matching device according to claim 11, wherein the pixel value feature generation unit associates, when the pixel value feature generation unit generates the first pixel value feature quantity from the feature point set from which the first position feature quantity evaluated to have matched the first reference position feature quantity is generated, the first reference position feature quantity and the generated first pixel value feature quantity in the association information.

13. The feature point matching device according to claim 12, wherein the feature matching unit detects the first reference position feature quantity evaluated to have matched the second position feature quantity, evaluates whether or not the first pixel value feature quantity associated with the detected first reference position feature quantity matches the second pixel value feature quantity generated from the feature point set from which the second position feature quantity is generated so as to match the first feature point set and the second feature point set.

14. The feature point matching device according to claim 1, wherein the position feature quantity for the at least one feature point is different from the pixel value feature quantity for the at least one feature point.

15. The feature point matching device according to claim 1, wherein the pixel value feature quantity for the at least one feature point is inputted to the pixel value feature generation unit independent of the position feature generation unit.

16. The feature point matching device according to claim 1, wherein the at least one feature point comprises a feature point set including a plurality of feature points each comprising the at least one feature point.

17. The feature point matching device according to claim 16, wherein the feature point matching device further comprises a feature storage unit that stores association information, the association information associating a first reference pixel value feature quantity and the first position feature quantity, the first reference pixel value feature quantity being a predetermined first pixel value feature quantity, the first position feature quantity being generated from a first feature point set from which the first pixel value feature quantity evaluated to have matched the first reference pixel value feature quantity is generated.

18. The feature point matching device according to claim 17, wherein the position feature generation unit associates, when the position feature generation unit generates the first position feature quantity from the feature point set from which the first pixel value feature quantity evaluated to have matched the first reference pixel value feature quantity is generated, the first reference pixel value feature quantity and the generated first position feature quantity in the association information.

19. The feature point matching device according to claim 18, wherein the feature matching unit detects the first reference pixel value feature quantity evaluated to have matched the second pixel value feature quantity, evaluates whether or not the first position feature quantity associated with the detected first reference pixel value feature quantity matches the second position feature quantity generated from the feature point set from which the second pixel value feature quantity is generated so as to match the first feature point set and the second feature point set.

20. The feature point matching device according to claim 16, wherein the feature point matching device further comprises a feature storage unit that stores association information, the association information associating a first reference position feature quantity and the first pixel value feature quantity, the first reference position feature quantity including a predetermined first position feature quantity, the first pixel value feature quantity being generated from a first feature point set from which the first position feature quantity evaluated to have matched the first reference position feature quantity is generated,
    wherein the pixel value feature generation unit associates, when the pixel value feature generation unit generates the first pixel value feature quantity from the feature point set from which the first position feature quantity evaluated to have matched the first reference position feature quantity is generated, the first reference position feature quantity and the generated first pixel value feature quantity in the association information, and
    wherein the feature matching unit detects the first reference position feature quantity evaluated to have matched the second position feature quantity, evaluates whether or not the first pixel value feature quantity associated with the detected first reference position feature quantity matches the second pixel value feature quantity generated from the feature point set from which the second position feature quantity is generated so as to match the first feature point set and the second feature point set.

* * * * *